June 28, 1960     W. C. RHINE     2,943,254
CONTROL FOR PLUGGING AN ELECTRIC MOTOR
Filed Dec. 16, 1957
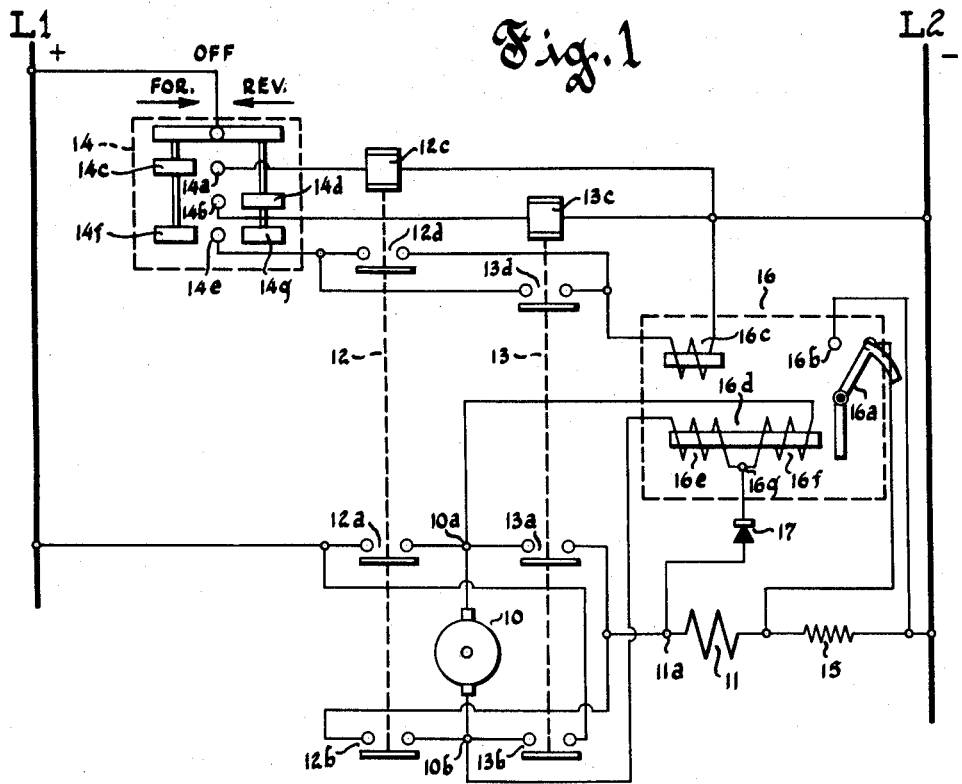
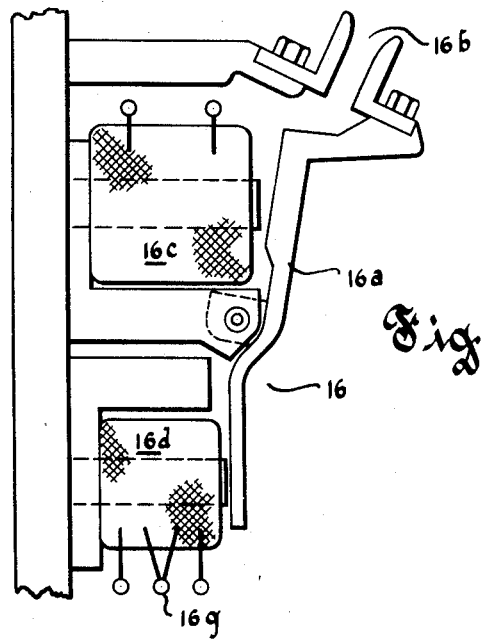
Inventor
William C. Rhine
By H R Ritter
Attorney United States Patent Office 2,943,254
Patented June 28, 1960

2,943,254

CONTROL FOR PLUGGING AN ELECTRIC MOTOR

William C. Rhine, Menomonee Falls, Wis., assignor to Cutler-Hammer, Inc., Milwaukee, Wis., a corporation of Delaware Filed Dec. 16, 1957, Ser. No. 703,118

5 Claims. (Cl. 318—373)

This invention relates generally to motor controls, and while not limited thereto, more particularly relates to a control for plugging a D.C. motor.

D.C. motors may be reversed by reversing the direction of current flow through the armature. Reversal of current flow while the armature is still rotating in its former direction is called "plugging" or "reverse current braking" and is useful to achieve rapid reversal of armature rotation. However, when a motor is plugged, nearly double voltage appears across the armature circuit (i.e., armature countervoltage has the same polarity as the voltage impressed on the armature) and it becomes necessary to insert resistance to limit inrush current therethrough. Prior control schemes which relied on polarity conditions within the motor to control plugging resistance employed either a multiplicity of resistors, contactors and rectifiers, or else depended on contactors of complex construction.

Accordingly, it is an object of this invention to provide improved and simplified means for controlling the current limiting resistance employed during plugging of a motor.

Another object is to provide means of the aforesaid character comprising a simple contactor of special construction and a unidirectional current flow device thereby eliminating a number of constituent elements formerly necessary in some motor control circuits.

Still another object is to provide a control of the aforesaid character which is responsive to armature countervoltage and is not affected by line voltage fluctuations.

Other objects and advantages of the invention will hereinafter appear.

The accompanying drawing illustrates a preferred embodiment of the invention which will now be described, it being understood that the embodiment illustrated is susceptible of various modifications with respect to detail without departing from the scope of the appended claims.

In the drawing:

Figure 1 is a diagrammatic showing of a motor control circuit incorporating the invention; and Fig. 2 is a side elevational view of a contactor employed in the circuit.

In the embodiment shown, a D.C. series motor having an armature 10 and a field winding 11 is connectable to the power supply lines L1 and L2 for rotation in either forward or reverse direction by electroresponsive contactors 12 and 13, respectively, which are under the control of a drum type master switch 14 which has "Off," "Forward" and "Reverse" positions. A current limiting resistor 15 is adapted to be inserted into and shunted out of the motor armature circuit to limit inrush current during plugging under the control of an electroresponsive contactor 16 of special construction and a unidirectional conducting device 17 in circuit therewith which is responsive to armature countervoltage as will hereinafter be more fully explained. For the sake of simplicity the contactor, resistors and circuitry normally employed to regulate motor speed have been omitted.

Referring to Fig. 1, the electroresponsive contactors 12 and 13 are provided with electromagnetic operating coils 12c and 13c, respectively, which are connected on one side to line L2 and connected on their other side to the stationary contact fingers 14a and 14b of drum switch 14. Fingers 14a and 14b are connectable to line L1 through the movable contact segments 14c and 14d, when the latter are moved to "Forward" and "Reverse" positions, respectively.

The right side of field winding 11 is connected to one side of a resistor 15 and the other side of the latter is connected to line L2. The left side of field winding 11 is alternatively connectable to the terminals 10a and 10b of motor armature 10 through the normally open contacts 13a and 12b, respectively, of contactors 13 and 12. Terminals 10a and 10b are connectable to line L1 through the normally open contacts 12a and 13b, respectively, of contactors 12 and 13.

Electroresponsive contactor 16 comprises a pivotable armature member 16a which normally is maintained in the position shown in Fig. 2 by gravity and which controls the normally open contacts 16b connected in a circuit across resistor 15. Contactor 16 further comprises an electroresponsive armature closing coil 16c and an electroresponsive armature holdout coil 16d arranged on cores as shown in Fig. 2. Closing coil 16c is connected on one side to line L2 and is connectable on its other side to the stationary contact finger 14e through either of the normally open contacts 13d or 12d of contactors 13 and 12. Contact finger 14e is connectable to line L1 through the movable contact segments 14f and 14g, respectively, when the latter are moved to "Forward" and "Reverse" positions. Holdout coil 16d which comprises a pair of magnetically opposed windings 16e and 16f serially connected at junction point 16g is connected on one side to terminal 10a and on its other side to terminal 10b.

A unidirectional conducting device, such as a half-wave rectifier 17, is connected on one side to a point 11a to the left of field winding 11 and is connected on its other side to junction 16g. Rectifier 17 is poled as shown in Fig. 1 to permit current to flow toward junction 16g.

Windings 16e and 16f which comprise holdout coil 16d are serially connected and wound in opposition to each other. Thus, when current flow through both windings (i.e., from terminals 10a to 10b or vice-versa) is substantially equal no net M.M.F. is produced by holdout coil 16d. However, when current flow through one winding is a predetermined value greater than through the other (i.e., when either winding 16e or 16f is shunted by the circuit containing rectifier 17) in response to armature 10 countervoltage polarity being the same as impressed voltage polarity during plugging, a net M.M.F. appears in holdout coil 16d which is sufficient to prevent armature member 16a from being attracted by closing coil 16c even though the latter is fully energized. The strong pull of holdout coil 16d is attributed to the relatively small air gap between its core and armature member 16a when the latter is in the position shown in Fig. 2. However, when the difference in energization between windings 16e and 16f decreases to a predetermined value, closing coil 16c is able to attract armature member 16a thereby effecting closure of contacts 16b and removal of resistor 15 from the circuit.

The system operates in the following manner:

Assume that lines L1 and L2 are energized, that the switches and contactors are in the condition shown in Figs. 1 and 2, and that the motor is at rest.

When switch 14 is moved from "Off" to "Forward" position, segment 14c closes with finger 14a and segment 14f closes with finger 14e and a circuit is established from line L1 through segment 14c, finger 14a, coil 12c, to line L2. Thus energized, coil 12c effects closure of contacts 12a, 12b and 12d and a circuit is established from line L1 through contact 12a, motor armature 10 (from terminal 10a to 10b), contact 12b, field winding 11, and resistor 15, to line L2. Simultaneously, a circuit is established from line L1 through segment 14f, finger 14e, contact 12d and closing coil 16c to line L2. Thus energized, motor armature 10 rotates in the forward direction and the polarity of the countervoltage "opposes" that of the impressed voltage. Current flows from terminal 10a, through windings 16f and 16e to terminal 10b. Rectifier 17 prevents current flow from junction 16g to point 11a and no current tends to flow in the opposite direction. Accordingly, no net M.M.F. appears in holdout coil 16d and fully energized closing coil 16c attracts armature member 16a to effect closure of contacts 16b and shunting of resistor 15.

Now assume that the motor is plugged. When switch 14 is moved from "Forward" to "Off" position, segment 14c and finger 14a and segment 14f and finger 14e open and coils 12c and 16c are deenergized to effect opening of contacts 12d, 12a and 12b and dropout of contacts 16b by gravity. The motor, still rotating in the forward direction, is disconnected from the power supply and resistor 15 is again connected in circuit. When switch 14 is moved from "Off" to "Reverse" position, segment 14d and finger 14b and segment 14g and finger 14e close and a circuit is established from line L1 through segment 14d, finger 14b, coil 13c, to line L2. Thus energized, coil 13c effects closure of contacts 13a, 13b and 13d and a circuit is established from line L1 through contacts 13b, motor armature 10 (from terminal 10b to 10a), contact 13a, field winding 11 and resistor 15 to line L2. Simultaneously, a circuit is established from line L1 through segment 14g, finger 14e, contact 13d and closing coil 16c to line L2. Motor armature 10 is energized for rotation in the reverse direction but is still actually rotating in the forward direction, consequently, the polarity of armature 10 countervoltage is the same as the polarity of the voltage impressed on the armature. Current flows from terminal 10a, contact 13a, point 11a, through rectifier 17, junction 16g and winding 16e to motor terminal 10b but only negligible current flows through winding 16f. Accordingly, a net M.M.F. appears in holdout coil 16d sufficient to prevent fully energized closing coil 16c from attracting armature member 16a. Resistor 15 is maintained in circuit to limit inrush current until motor armature 10 decelerates a predetermined amount preparatory to reversal of rotation whereupon the value of the M.M.F. appearing in holdout coil 16d is insufficient to hold armature member 16a against attraction by closing coil 16c. Consequently, contacts 16b close and resistor 15 is shunted. After motor armature 10 has decelerated to zero and commences to rotate in the reverse direction for which it is energized, the polarity of the countervoltage again "opposes" that of the impressed voltage, therefore current flows from terminal 10b, through winding 16e and 16f to terminal 10a and no net M.M.F. is produced by holdout coil 16d.

It is to be understood that with the motor running in reverse, plugging would effect results comparable to those hereinbefore described, except that winding 16e would be shunted and winding 16f would cause the appearance in holdout coil 16d of a M.M.F. effective to prevent closing coil 16c from attracting armature member 16a to thereby prevent closure of contacts 16b and shunting of resistor 15 during plugging.

Although the invention has been described in connection with a simple D.C. series wound motor, it will be apparent to those skilled in the art that its employment is not limited thereto.

I claim:

1. In a plugging control for an electric motor having means for reversing the polarity of the supply voltage impressed across the motor armature, in combination, current limiting means in circuit with said armature, first electroresponsive means normally rendering said current limiting means ineffective whenever said motor is energized, second electroresponsive means connected across said armature for controlling operation of said first electroresponsive means, said means comprising a plurality of portions normally equally energized when said armature is energized, and a unidirectional conducting device connected across at least one of said portions to effect predetermined deenergization of said one of said portions in response to reversal of the polarity of said supply voltage impressed across said armature during plugging whereby said second electroresponsive means prevents said first electroresponsive means from rendering said current limiting means ineffective until said armature slows down to a predetermined speed.

2. In a plugging control for an electric motor having means for reversing the polarity of the supply voltage impressed across the motor armature, in combination, current limiting means in circuit with said armature, first electroresponsive means normally rendering said current limiting means ineffective whenever said motor is energized, electromagnetic means connected across said motor armature for controlling operation of said first electroresponsive means, said electromagnetic means comprising at least a pair of magnetically opposed windings equally energizable to produce a net magneto-motive force of zero, and a unidirectional conducting device connected across at least one of said windings to effect predetermined deenergization of said one winding in response to reversal of the polarity of said supply voltage impressed across said armature and consequent appearance of a net magneto-motive force in said electromagnetic means sufficient to prevent said first electroresponsive means from rendering said current limiting means ineffective until said armature slows down to a predetermined speed.

3. In combination, a source of power supply, an electric motor, means for reversing the polarity of the power supply voltage impressed across the armature of said motor to effect reversal of rotation of said armature, current limiting means in circuit with said armature to limit inrush current during plugging, first electroresponsive means for shunting said current limiting means out of circuit whenever said motor is energized, second electroresponsive means connected across said armature for controlling operation of said first electroresponsive means, said second electroresponsive means comprising at least a pair of electromagnetically opposed windings equally energizable to produce a net magneto-motive force of zero, and a unidirectional conducting device connected across at least one of said windings to effect predetermined deenergization of said one winding in response to reversal of the polarity of the power supply voltage impressed across said armature during plugging whereby a predetermined magneto-motive force is produced by said second electroresponsive means sufficient to prevent said first electroresponsive means from shunting said current limiting means out of circuit until said armature slows down to a predetermined speed.

4. In combination, a source of power supply, an electric motor, means for reversing the polarity of the voltage applied to the armature of said motor to thereby reverse its rotation, current limiting means, a movable member for controlling said current limiting means, first electroresponsive means energizable when said motor is energized to attract said movable member to place said current limiting means in circuit with said armature, second electroresponsive means connected across said armature adapted to act upon said movable member, said second electroresponsive means comprising at least a pair of eletctromagnetically opposed windings equally energizable to produce a net M.M.F. of zero, and a undirectional conducting device connected across at least one of said windings to deenergize the latter a predetermined amount in response to reversal of polarity of the voltage applied across said armature during plugging whereby said second electroresponsive means produces a M.M.F. sufficient to prevent said movable member from being attracted by said first electroresponsive means until said armature slows down to a predetermined speed.

5. In a plugging control system for a direct current electric motor having means for selectively connecting the motor armature to a direct current power supply source for either forward or reverse rotation and current limiting means connected in circuit with said armature and electroresponsive means normally operable to render said current limiting means ineffective in response to operation of said armature connecting means, the improvement comprising second electroresponsive means connected across said armature for controlling the first electroresponsive means, said second electroresponsive means comprising differential elements afforded opposing energizations in response to energization of said armature in either the forward or reverse direction thereby to render the same ineffective to prevent operation of said first electroresponsive means, and a unidirectional conducting device connected to said differential elements and operable in response to the motor counter voltage when the armature power connections are reversed while the motor is still rotating in the first direction to alter the ratio of said energizations of said differential elements thereby to prevent said first electroresponsive means from rendering said current limiting means ineffective until the motor speed decreases to a predetermined value.

References Cited in the file of this patent

UNITED STATES PATENTS 2,233,169    Jones  ---------------- Feb. 25, 1941